United States Patent
Borg

[11] 3,827,289
[45] Aug. 6, 1974

[54] VEHICLE TEST FIXTURE
[75] Inventor: Henry A. Borg, Romeo, Mich.
[73] Assignee: The United States of America as represented by the Secretary of the Army, Washington, D.C.
[22] Filed: Dec. 5, 1972
[21] Appl. No.: 312,418

[52] U.S. Cl. .................................. 73/71.7, 73/118
[51] Int. Cl. ........................................ G01m 17/04
[58] Field of Search............ 73/116, 71.7, 11, 88 R, 73/118

[56] References Cited
UNITED STATES PATENTS
3,555,893  1/1971  Holzman .............................. 73/71.7
3,718,033  2/1973  Petersen ............................. 73/71.1

*Primary Examiner*—Jerry W. Myracle
*Attorney, Agent, or Firm*—Edward J. Kelly; Herbert Berl; John Schmidt

[57] ABSTRACT

A test fixture for an all-wheel drive vehicle provides a vertical hydraulic ram for each wheel position. Universal joint type connecting means are used to secure the vehicle atop the rams in the same way that the vehicle is secured to the wheels. Each connecting means, with its ram, permits six degrees of movement to the wheel spindle to allow the spindle to move in accordance with the dictates of the wheel suspension geometry as the ram raises and lowers the wheel spindle to simulate irregularities in terrain. The fixture has input capabilities for fore-and-aft as well as transverse forces, and torque input to the wheel drives is provided for separate dynamometer loading of the wheel drives. The rear connection is shown provided with means to adjust the tapered roller bearings remotely, including a long-handle socket wrench which remains in place and is accessible after removal of the dynamometer connection, without disassembling the means by which the wheel spindle is mounted on the ram.

15 Claims, 8 Drawing Figures

VEHICLE TEST FIXTURE

The invention described herein may be manufactured, used, and licensed by or for the Government for governmental purposes without payment to me of any royalty thereon.

BACKGROUND OF THE INVENTION

1. Field of the Invention

The invention relates to fixtures for the testing of full-size, actual vehicles by simulating terrain conditions likely to be encountered in operation of the vehicle.

2. Description of the prior art

Much of the prior art approaches the problem in terms of large drums to support the wheels. Such devices have some value, because of course each drum can be connected to a dynamometer, and the drums can be movably mounted. Nevertheless, the controllable drum approach has inherent limitations. For example, the size and weight of the drums introduces inertia problems that are not readily overcome and when an effort is made to move a drum to simulate road conditions, large amounts of power are required. Moreover, prior art methods are geared to the testing of slower speed vehicles and to the simulation of highway conditions, and thus do not lend themselves to high speed testing or to the simulation of off-highway operating conditions.

SUMMARY OF THE INVENTION

This invention provides means for a realistic testing of a full size wheeled vehicle. It should be remembered that, while wheel movement is a function of variations in the terrain traversed, it is also a function of wheel suspension geometry. Thus, terrain features dictate whether the wheel moves up or down, and the forces imposed on the wheel, while the suspension geometry dictates the manner in which the vehicle responds to terrain changes and those forces.

Accordingly, this invention provides each wheel with six degrees of freedom so that the vehicle may respond to terrain changes in the manner dictated by the suspension geometry. For analytical purposes, the degrees of freedom can be broken down into freedom for the wheel to move translatorily about three mutually perpendicular axes, and simultaneously freedom to oscillate about each of said axes. Terrain changes are simulated by means which impose forces on the vehicle as nearly identical as possible with actual forces.

More specifically, the test fixture comprises a plurality of supports equal in number to the number of wheels. Each upport is connected with the vehicle in the same manner as the wheel is normally connected with the vehicle; in fact, the vehicle connection with the support takes the place of the vehicle wheel and comprises a housing element with an elongated cylindrical bore which receives the wheel drive and connects with the suspension in the same manner as the vehicle wheel; said element carries a shaft having an axis of rotation which is parallel to the axis of said cylindrical bore. The shaft is slidable and oscillatable in one bore of a pillow block; resilient means center the pillow block on the shaft, and the block in turn is provided with a second bore at right angles to its first bore to receive a second shaft with respect to which it is also slidable and oscillatable. The second shaft is mounted in a yoke which is carried on a vertical ram; four such rams, for a four-wheeled vehicle, constitute the aforesaid plurality of supports and they in turn are an integral part of the building structure, providing a vertical movement capability to simulate terrain irregularities, and other rams engage the vehicle connections to provide control capabilities along horizontal axes while dynamometers provide oscillatory inputs about the horizontal axes to simulate loading and terrain problems.

A housing element which receives a wheel drive provided with opposed axial thrust bearings is desirably designed to facilitate adjustment of the axial spacing of the bearings with the vehicle in place on the fixture. To that end, a long socket wrench lying in the housing engages the spindle nut at its socket end, and the opposite end of the wrench is accessible to a mechanic. The bearing adjustment is secured by set screws placed to hold the wrench fixed against rotation relative to the spindle.

THE PREFERRED EMBODIMENT

Figure 1:
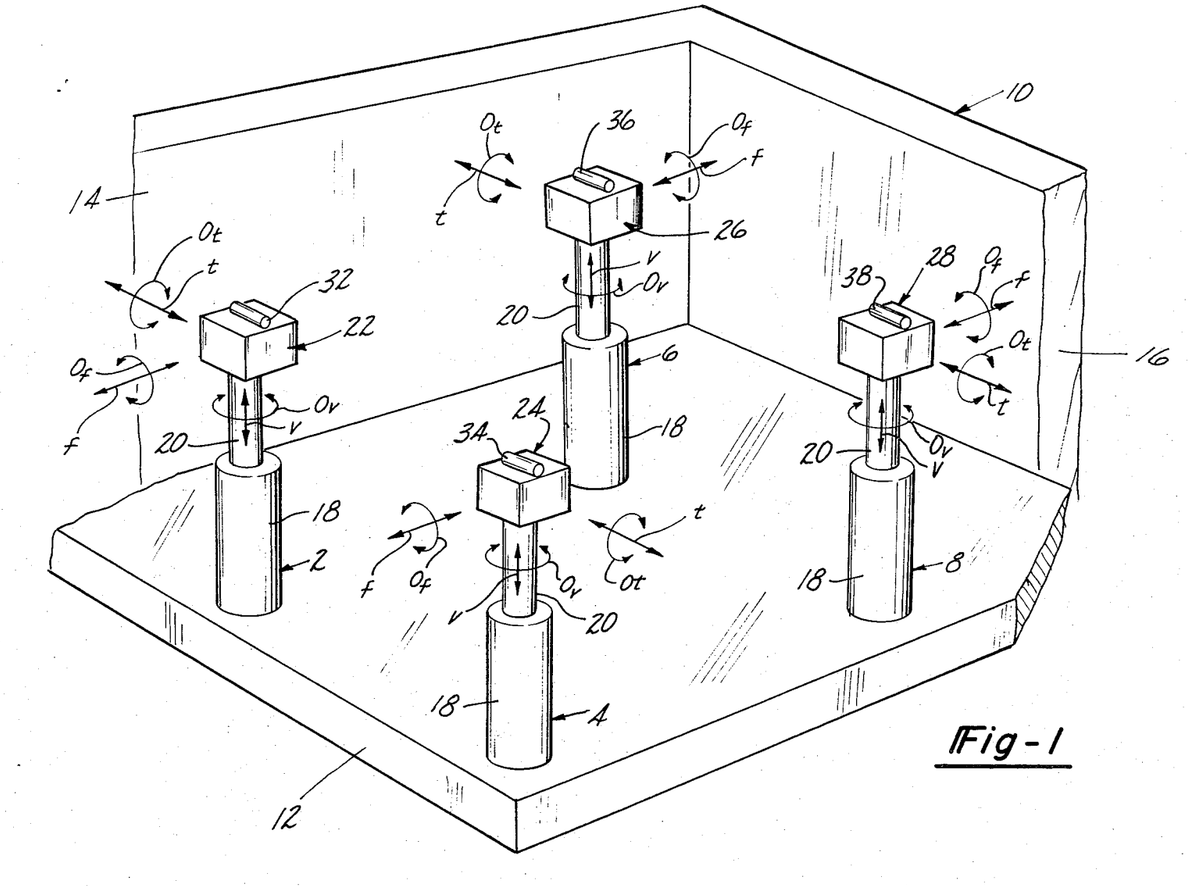
FIG. 1 is a schematic view of a complete test apparatus concept showing a test fixture in diagrammatic form in a building structure.

The embodiment of the invention here shown is designed to test a four-wheeled vehicle. Accordingly, four substantially vertical supports 2, 4, 6 and 8 are shown mounted on a common base indicated generally at 10. It should be understood that substantial loads and forces will be imposed upon and directed against base 10, which should be structurally capable of withstanding the loads. As here shown, base 10 comprises a floor 12 and sidewalls secured thereto through the building foundation or by other suitable conventional architectural means. In FIG. 1, two walls 14 and 16 are shown, the other two being here omitted to avoid obscuring other, unconventional, details.

In the illustrated embodiment, each vertical support (2, 4, 6, 8) is a hydraulic ram, having a cylinder 18 secured to floor 12, and a piston rod 20. To the upper end of each piston rod is secured means to connect the support with a vehicle in the same manner as the completely assembled vehicle carries a wheel. The connecting means are shown schematically in FIG. 1 at 22, 24, 26 and 28 at the upper ends of the piston rods 20 of vertical supports 2, 4, 6 and 8 respectively.

Shown schematically at the top of the connecting means are housing elements 32, 34, 36 and 38 for supports 2, 4, 6 and 8 respectively. The housing elements engage structural parts of the vehicle in much the same manner as the wheels are mounted on the vehicle, as will be detailed below.

Because the object of the test fixture is to determine the effect on vehicle structure of the vehicle's response to the terrain traversed, the test fixture desirably allows each wheel spindle the freedom it requires to move according to the dictates of the suspension geometry. Accordingly, each connecting means allows six degrees of freedom of movement to the wheel spindle. Three of the degrees of freedom are translatory, along three mutually perpendicular axes, and the remaining three are oscillatory, about said three mutually perpendicular axes.

Each of the degrees of freedom is represented diagrammatically in FIG. 1 as a two-headed arrow. Of the translatory freedoms, probably the most basic is vertical movement because it is a by-product of gravitational force; the two-headed arrow representing vertical freedom of movement is identified by $v$ for each vertical support.

Because the usual or normal direction of vehicle movement, fore-and-aft, generates many of the forces imposed on the vehicle, one of the mutually perpendicular axes is the fore-and-aft direction, represented by the two-headed arrow $f$ in the diagrammatic showing of degrees of freedom in FIG. 1 in connection with each of the four vertical supports and their associated connecting means.

The third freedom of translatory movement is along an axis transverse to usual vehicle movement; such movement is induced by operating on a side slope, centrifugal forces in a turn, and the like, and this third one of the three mutually perpendicular axes is identified by $t$ in FIG. 1 for each vertical support.

One degree of freedom for each of the three mutually perpendicular axes is the freedom to oscillate about that axis (or about an axis parallel thereto). The two-headed arrow $o_v$ is the one representing freedom to oscillate about axis $v$; $o_f$ identifies the arrow representing freedom to oscillate about axis $f$; and $o_t$ identifies the arrow representing freedom to oscillate about axis $t$.

Figure 2:
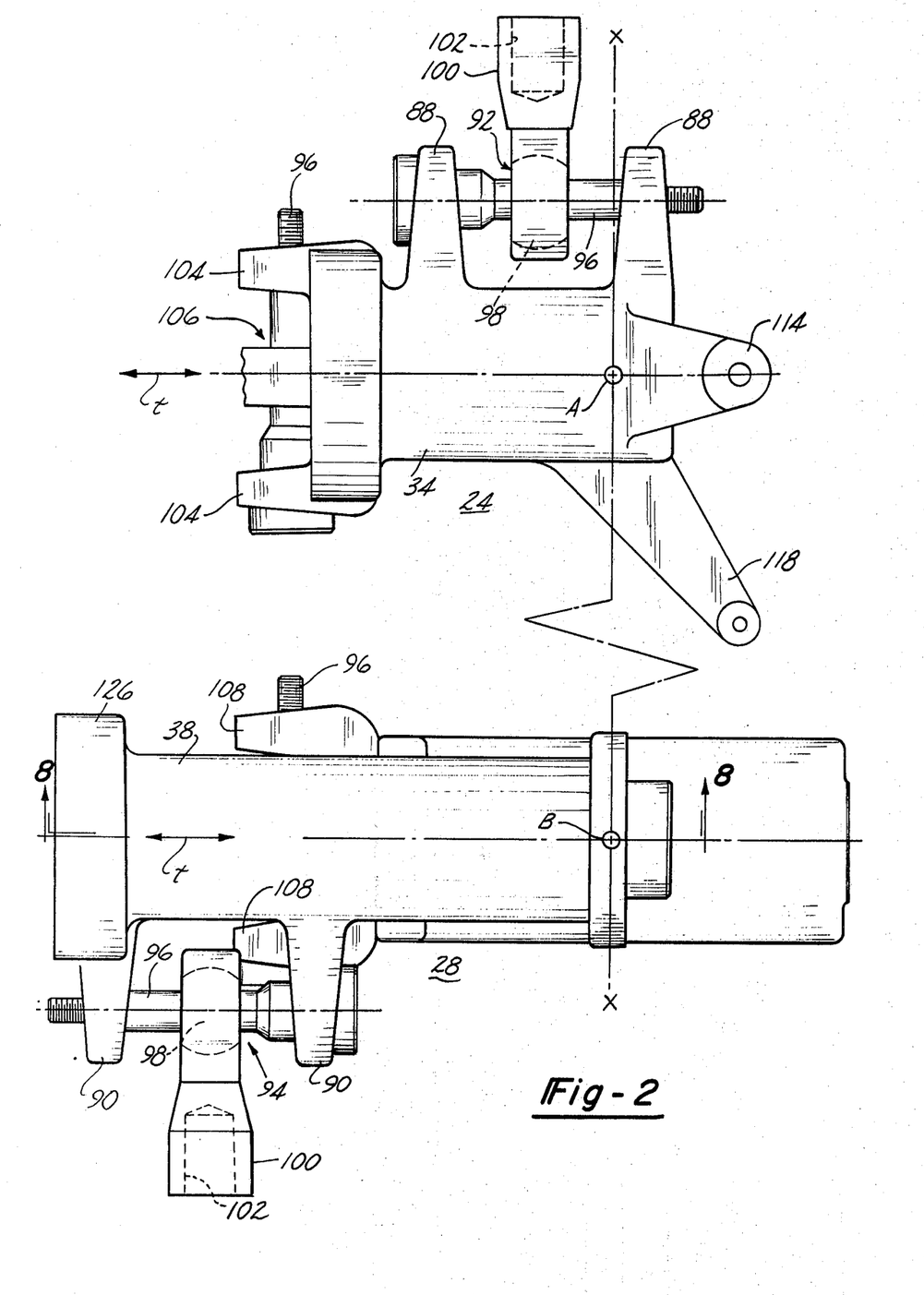
FIG. 2 is a top plan view, partially schematic, showing the front and rear vehicle connections for the left side of a vehicle.

For a detailed discussion of the connecting means, reference is made to the remaining figures of the drawings. In FIG. 2, the connecting means for the left side of the test fixture are shown at 24 and 28 aligned on axis X—X which is substantially parallel to the direction of usual vehicle motion. The points of intersection A and B of axis X—X with the wheel axes of rotation mark the center lines of the front and rear tires, respectively. Those skilled in the art will understand that the fore-and-aft spacing of means 24 and 28 along axis X—X is considerably foreshortened as shown in FIG. 2.

The housing elements, referred to above and shown schematically in FIG. 1 as cylinders 32, 34, 36 and 38 mounted atop connecting means 22, 24, 26 and 28 respectively, appear in top plan in FIG. 2. Because FIG. 2 shows only the left side of the vehicle test fixture, only the housing elements 34 and 38 appear in FIG. 2. It will be understood by those skilled in the art that connecting means 22 and 26 are substantially mirror images of connecting means 24 and 28 respectively, and that the description of details of one connecting means is equally applicable to its corresponding mirror image part.

Figure 3:
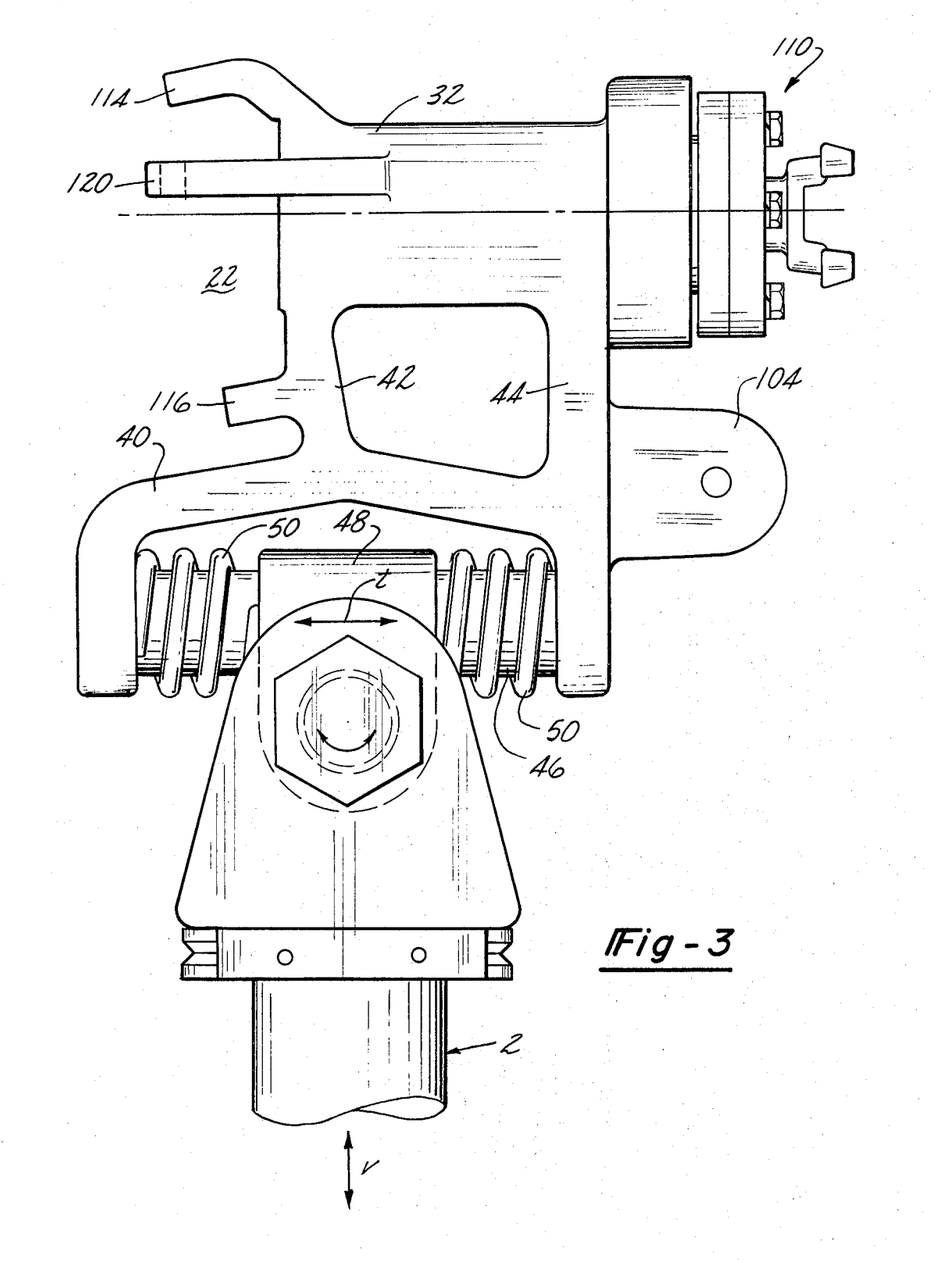
FIG. 3 is a view in elevation of the right front connection from a position between the ends of the vehicle and looking forward.
Figure 4:
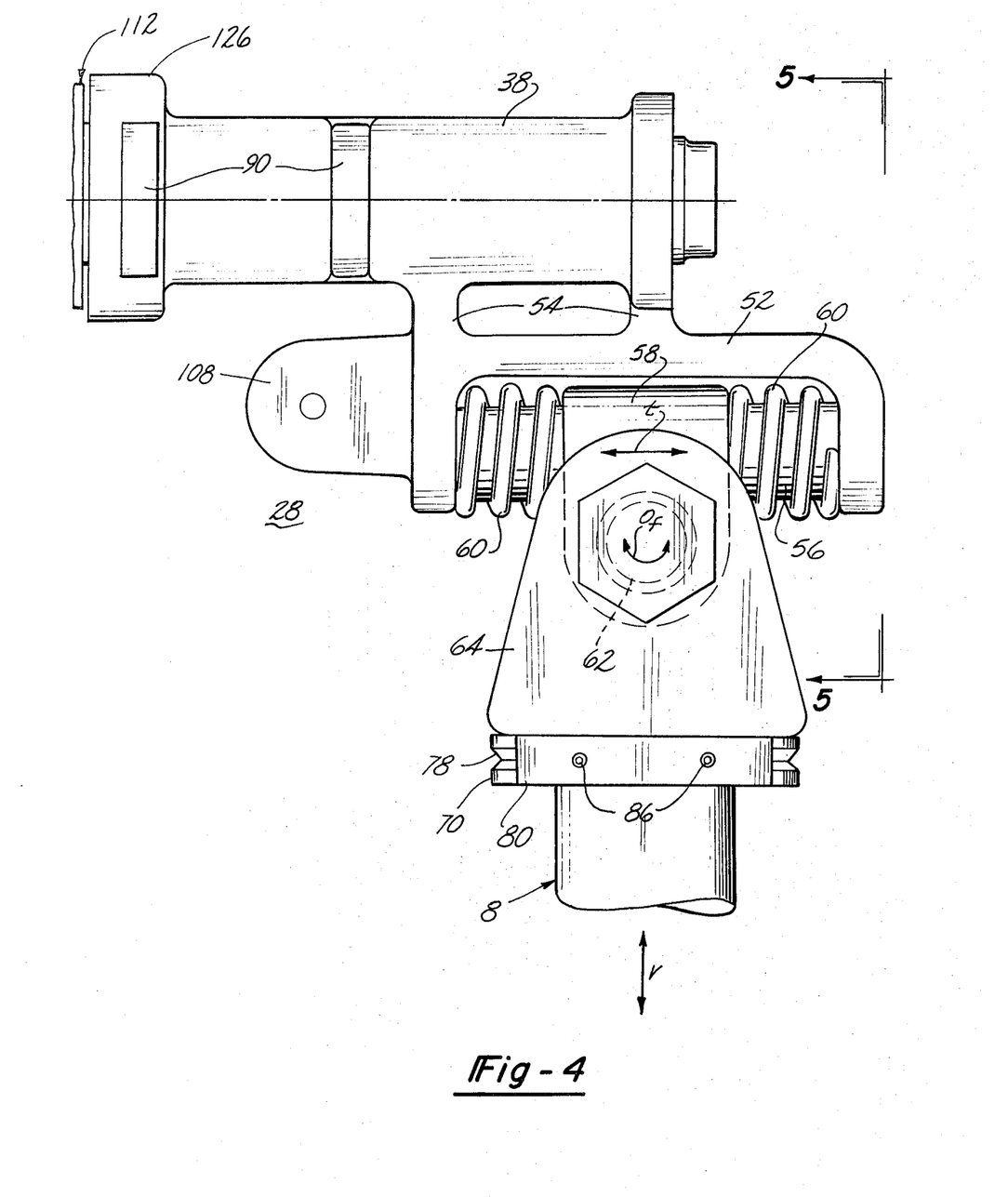
FIG. 4 is a rear elevation view of the left rear connection of the test fixture.
Figure 5:
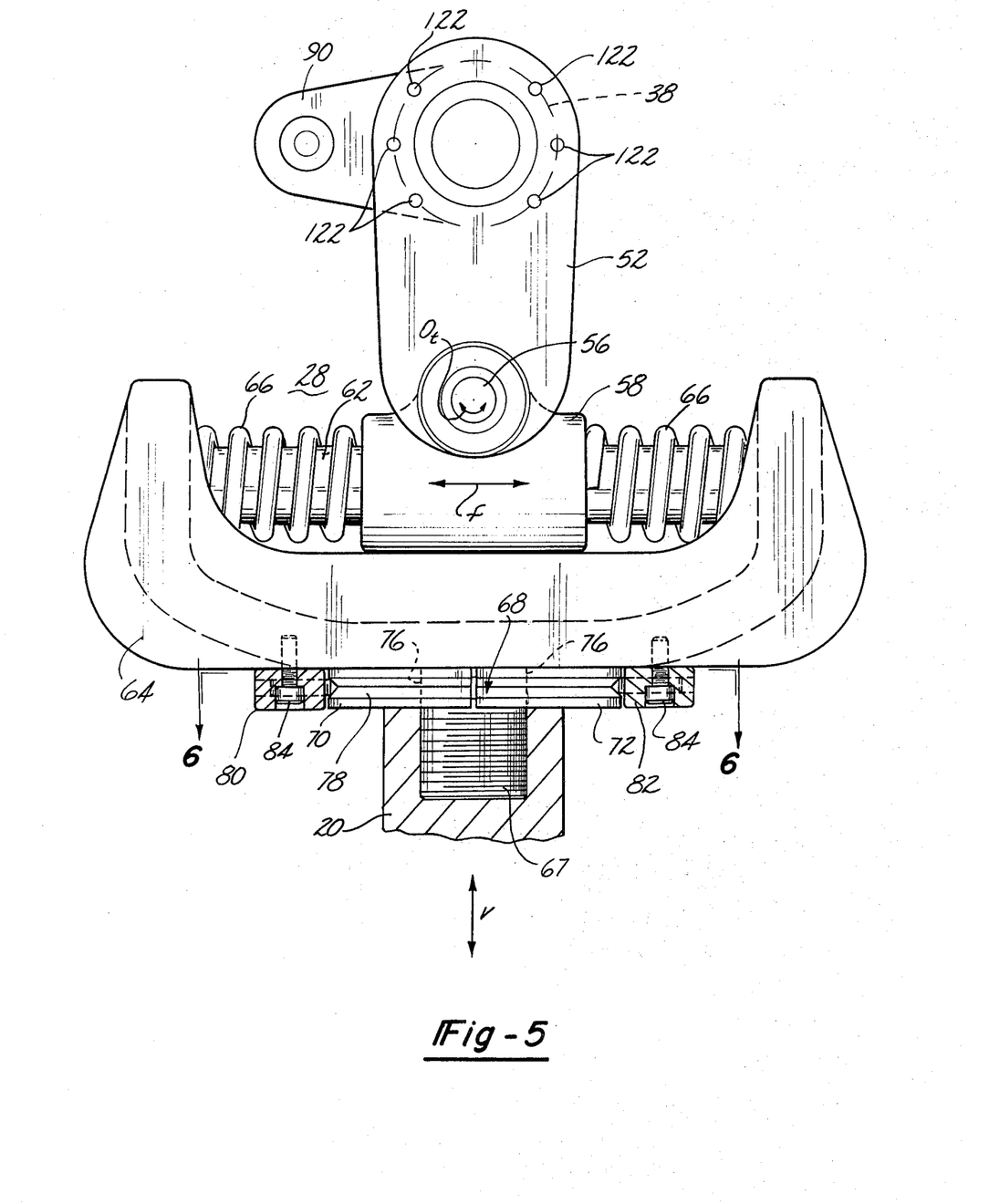
FIG. 5 is a side elevation view substantially from the plane of line 5—5 of FIG. 4.

As is best seen in FIGS. 3–5, in the illustrated preferred embodiment, each housing element is formed integral with a bifurcated element which mounts the ends of an elongated element. The elongated element engages a compound pillow block. By "compound," I mean that this pillow block provides two bearing surfaces, each of which is cylindrical, and the axes of the two cylinders are non-intersecting, at right angles to each other.

The aforesaid elongated element, here shown as a shaft, is mounted in one of the cylindrical bearings of the pillow block, as indicated above, and a second shaft, or elongated element, is mounted in the other cylindrical bearing. A second bifurcated element engages the ends of the second shaft and is mounted on its associated vertical support. Preferably, and as here shown, the compound pillow block is centered on each shaft by resilient means.

Specifically, in FIG. 3, a bifurcated element 40 is secured to the underside of housing element 32 by means of struts 42 and 44. Element 40 engages the ends of elongated element (shaft) 46. Compound pillow block 48 is mounted on shaft 46 and is preferably resiliently centered between the ends of element 40 by any suitable resilient elastic means such as Belleville washers, helical springs, rubber bushings, or the like. In the embodiment illustrated, coil springs 50 are mounted between opposing faces of block 48 and the ends of bifurcated element 40.

Similarly, FIG. 4 shows housing element 38 secured to a bifurcated element 52 by struts 54. Shaft 56 is held in element 52 and carries a compound pillow block 58, preferably centered by springs 60 between the ends of bifurcated element 52.

FIG. 5 is a view from the right side of FIG. 4 and, as such, best illustrates the second shaft and its relationship in the connecting means. As indicated above, pillow block 58 engages two non-intersecting shafts at right angles to each other: the aforesaid shaft 56, and a second shaft 62, of which the ends engage a bifurcated element 64. Coil springs 66 resiliently center block 58 between the ends of element 64.

Figure 6:
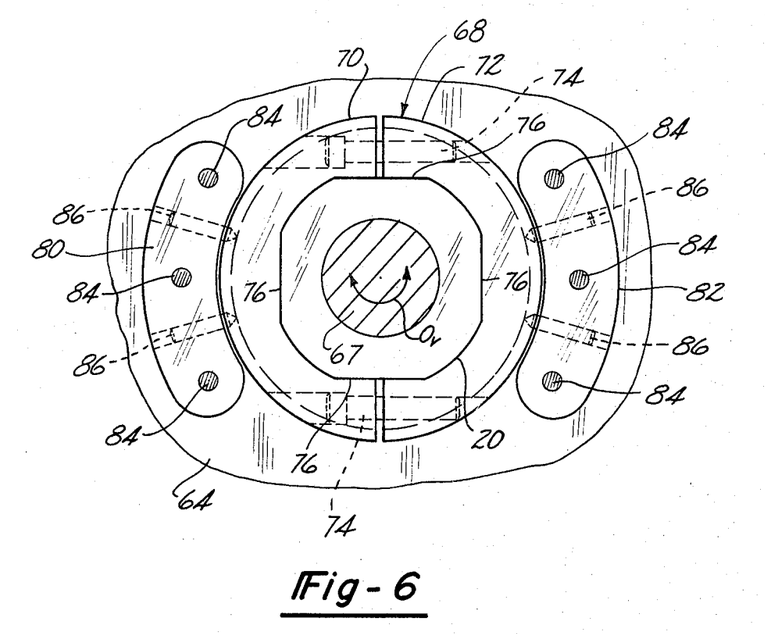
FIG. 6 is a sectional view on line 6—6 of FIG. 5.

Bifurcated element 64 carries a stud 67 which has threaded engagement with the upper end of piston rod 20 of vertical support 8. As is best shown in FIGS. 5 and 6, element 64 is held against rotation relative to rod 20 by a split ring and a pair of arcuate locks. More specifically, a split ring is indicated generally at 68 and comprises half rings 70 and 72 held together on piston rod 20 by screws 74. Piston rod 20 is provided at its upper end with four flats 76 and half rings 70 and 72 are correspondingly shaped.

Split ring 68 (the two half rings 70 and 72) is provided with a groove 78. Arcuate locks 80 and 82 are secured to bifurcated element 64 by screws 84 and closely adjacent to split ring 68. Set screws 86 in locks 80 and 82 engage ring 68 in groove 78 and secure the locks and the split ring against relative rotation, and thus hold bifurcated element 64 and piston rod 20 against relative rotation to keep element 64 (stud 67) from unscrewing and so becoming disconnected from rod 20.

It will be observed that accidental separation of element 64 and rod 20 could be prevented without locks 80 and 82, simply by securing half rings 70 and 72 to element 64 by means similar to screws 84. However, it is desirable that piston rod 20, at its upper end, tightly engage the lower face of element 64, better to withstand the severe forces transmitted between these two parts during test of a vehicle. The arrangement I have shown is independent of any requirement for a realignment of the screw holes at the expense of such an foresaid tight engagement. If, on disassembly, it should be found that half rings 70 and 72 have been pierced to a significant depth by set screws 86, half rings 70 and 72 as well as set screws 86 may readily be replaced by new parts.

Bifurcated elements 52 and 64 are capable of both translatory and rotary (or oscillatory) movement relative to compound pillow block 58. In the preferred embodiment shown in this application, the ends of shafts 56 and 62 are secured in bifurcated elements 52 and 64 respectively, and the shafts engage compound pillow block 58 by means of conventional bearings which allow the shafts to slide and to rotate in the pillow block; it is that relationship that provides four of the six degrees of freedom of movement hereinabove discussed.

More specifically, freedom of movement fore-and-aft is provided by the capability for relative translatory movement between block 58 and bifurcated element 64, along the axis of shaft 62, as indicated by the two-headed arrow $f$ in FIG. 5; freedom of movement to oscillate about the axis of shaft 62 is due to the capability for relative oscillation between block 58 and bifurcated element 64, indicated by the arcuate two-headed arrow $o_f$ in FIG. 4. Freedom of transverse movement is provided by the capability for relative translatory movement between block 58 and housing element 38 (because housing element 38 is made integral with bifurcated element 52), along the axis of shaft 56, as indicated by two-headed arrow $t$ in FIGS. 2 and 4; freedom of movement to oscillate about the axis of shaft 56 is due to the capability for relative oscillation between block 58 and housing 38 (or bifurcated element 52), shown by arcuate two-headed arrow $o_t$ in FIG. 5.

The remaining two degrees of freedom of movement, namely translatory movement vertically and oscillatory movement about a vertical axis, are provided by the conventional piston-and-cylinder ram and the usual axis of the cylinder and the piston, wherein the piston and rod are free to turn in the cylinder about their common axis; see two headed arrow $v$ in FIGS. 4 and 5 and arcuate two-headed arrow $o_v$ in FIG. 6.

The front vehicle support connecting means 22 is described in detail above only as to those elements including pillow block 48 and disposed above block 48 as seen in FIG. 3, whereas rear connecting means 28 is described in full in connection with FIGS. 4–6. It is pointed out that pillow blocks 48 and 58 of FIGS. 3 and 4 respectively may be, and preferably are, substantially identical, as are shafts 46 and 56 of FIGS. 3 and 4 respectively. Moreover, the several parts of the connecting means 22 including and disposed below block 48 in FIG. 3 are substantially identical to the corresponding parts in FIGS. 4 and 5, block 58 and below. Such identity is desirable so that parts may be interchangeable.

As aforesaid, vertical supports 2, 4, 6 and 8 are hydraulic rams, either single-acting for power lift and gravity return, or double-acting to provide "power-down" capability where that feature is desired. The vertical supports are provided with a lift capability so that the test fixture may simulate the surface irregularities normally encountered in operation. The most obvious effect of surface irregularities is of course vertical motion of the wheels. However, such irregularities have another significant effect on vehicle structure. As the vehicle in its forward motion, for example, causes a wheel to encounter either a "bump" (an obstruction above the ground) or a "pot-hole," the resulting force has the expected vertical component, but it also has a horizontal component.

In the test fixture here disclosed and claimed, means are provided to supply the horizontal components, namely the fore-and-aft component referred to in the previous paragraph, and a transverse component to be described below.

A fore-and-aft force input capability is provided by ears 88 on housing 34 and ears 90 on housing 38. Force input connectors 92 and 94 are shown in engagement with ears 88 and 90 respectively. Each connector comprises a pin 96, a universal joint assembly 98, and a socket element 100. Element 100 is adapted by such means as a threaded socket 102 to receive one end of any suitable conventional means for applying a reciprocating translatory force, as for example a hydraulic ram, not shown in the drawings. However, it will be understood by those skilled in the art that one end of such a ram will engage element 100 and the other end will engage the common base 10; more specifically, in the embodiment here shown in FIG. 1, the rams providing fore-and-aft forces to connecting means 26 and 28 will be suitably secured to wall 16 of common base 10, and to force input connectors 94 (FIG. 2) of each connecting means 26 and 28.

Similarly, vehicles are subjected to transverse forces due to operating on a side slope, during turns, and for many other reasons. Some such forces can be simulated by adjusting the vertical supports 2, 4, 6, 8 to different heights. However, the fixture may if desired be provided with a transverse force input capability. To that end, connecting means 22 and 24, FIGS. 3 and 2 respectively, are provided with ears 104; as is best seen in FIG. 3, ears 104 may be integral with the structure shown as housing 32, strut 44, and bifurcated member 40. Ears 104 will be provided with force input connectors, one of which is shown at 106 in FIG. 2. FIG. 2 also shows ears 108, shown in FIG. 4 as formed integral with the structure made up by housing 38, one of struts 54, and bifurcated member 52.

Conventional rams, not shown, will when their use is desired be connected with ears 104 and 108 on the fixture and with the side walls, such as wall 14 in FIG. 1, of the common base.

The test fixture here disclosed and claimed has been built to test military vehicles, which are often driven through more than one axle; in this case, a four-wheel drive vehicle is contemplated. Loading of the wheel drives is often desirable, and means are illustrated to provide such loading by dynamometers. Thus, FIGS. 3 and 4 show dynamometer couplings 110 and 112 fastened to the front and rear wheel drives, respectively.

It has been observed above that the test fixture connecting means carry housings which are secured to the vehicle in the same manner as the wheels are secured to the vehicle. Thus, the front connecting means 22 and 24 are provided with supports 114 and 116 for the upper and lower ball joints, respectively, and with left and right steering arms 118 and 120 respectively. The rear wheel suspension secures to the rear connecting means in the same manner as to the rear wheels, namely by the rear suspension cap screws (not shown) engaging threaded openings 122 in the end of housing 38.

Figure 7:
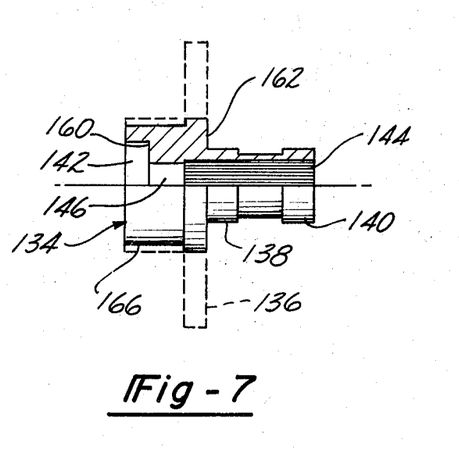
FIG. 7 is a partial section of a wheel drive hub, showing how a conventional wheel hub is modified for use in the test fixture.
Figure 8:
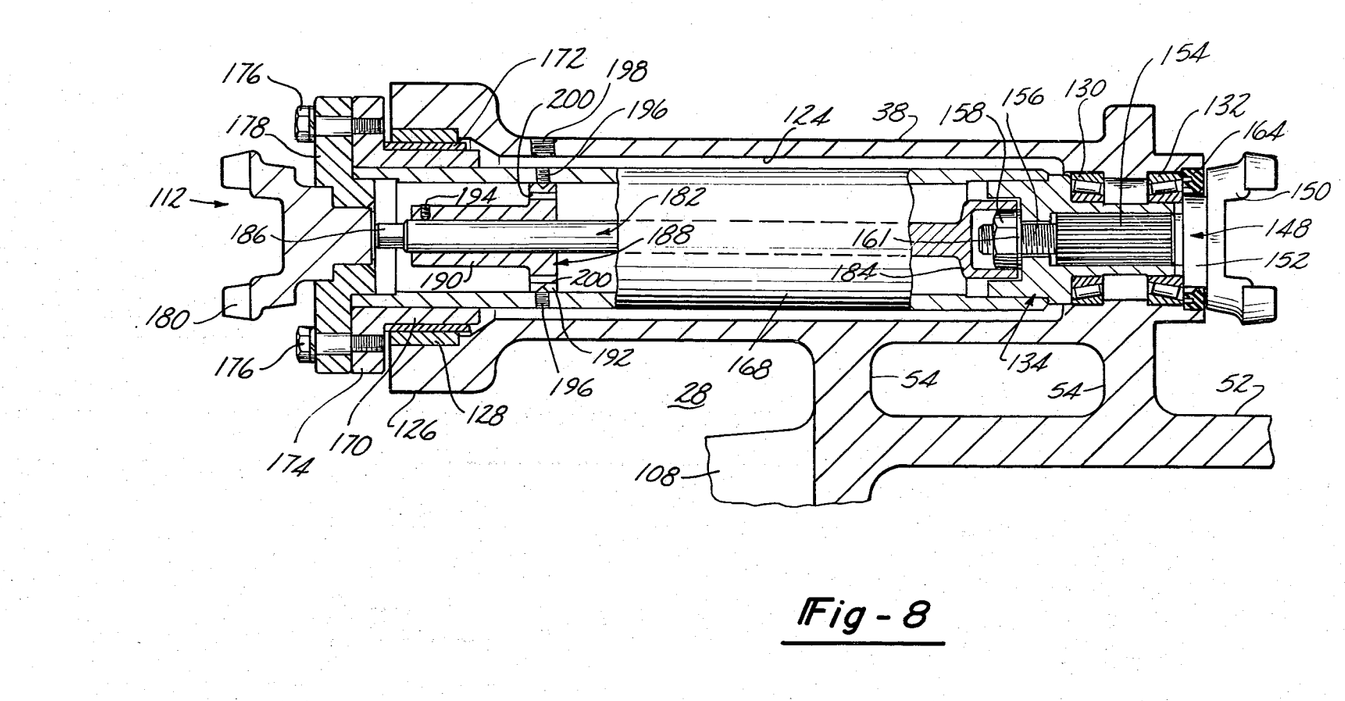
FIG. 8 is view in section, substantially on line 8—8 of FIG. 2, through a housing element to show how the dynamometer is connected to load the wheel drive, and how the opposed axial thrust bearings are adjusted.

Reference will now be made to FIGS. 7 and 8 for a description in detail of the means by which the rear dynamometer coupling is connected with the wheel drive of the vehicle. Housing 38 is provided with a bore 124 and the outer end of housing 38 is enlarged inside and out, as shown at 126, which enlarged end supports a bearing bushing 128 tightly engaging the bore as by a press fit. At its other end, the hollow housing supports a pair of axially spaced tapered roller bearings 130 and 132 which are the identical same bearings as those that support the vehicle wheel, not shown. The inner races of bearings 130 and 132 support a hub 134; as shown in FIG. 8, hub 134 is a modification of a standard wheel hub.

FIG. 7 shows how a conventional wheel hub is modified to form a part of the illustrated test fixture. In FIG. 7, the upper half of the hub is sectioned, and the lower half appears in elevation. The conventional hub is flanged as shown in dotted lines at 136; flange 136, in a vehicle, carries the studs to which the wheel is secured. In addition to the dotted line flange 136, there is shown, on the left of that flange, a dotted line outside diameter of the hub which shows the hub in its conventional outline. To adapt the conventional wheel hub to a hub for use with the test fixture here, the portions appearing in FIG. 7 between the dotted lines and the solid lines are machined away.

The hub portion on the right of flange 136 remains unaltered, and is provided with two lands 138 and 140. Internally, the hub 134 has a stepped bore of three diameters 142, 144, and 146, of which the portion 144 is splined as shown.

The test fixture here disclosed and claimed is designed for a four-wheel drive vehicle, of which the wheels are independently sprung or suspended. Hub 134 is shown in FIG. 8 as rotatably mounted in housing 38 by means of aforesaid opposed tapered, roller bearings 130 and 132 on lands 138 and 140 respectively. Bearings 130 and 132 thus support a wheel spindle 148 in bore 124 of housing 38 and coaxial with said bore 124.

Spindle 148 is a conventional wheel spindle of the vehicle that is to be tested, and is here shown as comprising part of a universal joint 150, a smooth cylindrical surface 152, an externally splined surface 154 adapted to engage internally splined bore 144, a threaded stud 156, and a nut 158 in threaded engagement with stud 156. The intersection of bores 142 and 146, FIG. 7, forms a plane surface or shoulder 160 which nut 158 reacts against through a washer 161. The other end of the reaction is the shoulder between smooth surface 152 and splined surface 154, which engages the right face of bearing 132; more specifically, the shoulder on surface 152 engages the right face of the inner race of bearing 132. The left face of bearing 130 is engaged by a face 162 on hub 134, face 162 being best shown in FIG. 7.

Smooth cylindrical surface 152 cooperates with a conventional oil seal 164 which, along with spindle 148 and bearings 130, 132, is the same identical part that goes into the vehicle assembly. Oil seal 164 fits in the extreme right end of bore 124.

Reference is made above to the diameter of hub 134, FIG. 7, to the left of flange 136, and shown in dotted lines, which is machined down to form a cylindrical surface, indicated in solid lines as surface 166. A tube 168 fully engages surface 166 and is welded to hub 134 at that surface.

At its left end as seen in FIG. 8, tube 168 carries a hub 170 and is welded to the hub at its internal surface. A hardened steel wear collar 172 engages the external surface by means of a press fit. Collar 172 rides in bearing bushing 128. Hub 170 carries a flange 174. Dynamometer coupling 112 is removably connected with flange 174 by means of threaded members 176 passing through openings in end plate 178 and engaging flange 174. Coupling 112 includes said end plate 178 and the portion 180 of a universal joint. Elements 178 and 180 are secured together in any suitable conventional manner so as to transmit torque between the dynamometer (not shown) and the wheel spindle 148, by way of said tube 168 and its connecting elements.

Referring again to nut 158 on stud 156, provision is made for remotely adjusting the axial play in bearings 130, 132 and their cooperating elements. A long-handle wrench indicated generally at 182 has at one end a socket 184 which, in the finished assembly, remains in engagement with nut 158 as long as a vehicle is on the test fixture. At its opposite end 186, wrench 182 is suitably polygonal for engagement by a wrench (not shown) in the hand of a mechanic who can reach end 186 after he or she removes dynamometer coupling 112.

Wrench 182 is supported at its right end by its engagement with nut 158. Because the wrench rotates with tube 168 during dynamometer test of the vehicle drive, the wrench should be substantially centered in the tube. At its left end, the wrench is located in a centering device 188 comprising a hub 190 and a flange 192. A set screw 194 in hub 190 close to its outer end is accessible to the mechanic to release wrench 182 prior to adjustment and to secure it again thereafter.

Flange 192 is secured relative to tube 168 by means of one or more set screws 196 which have threaded engagement with tube 168. Access to screws 196 is through an opening in housing 38 which is normally kept closed by a plug 198. Flange 192 is preferably provided with a plurality of openings 200 to avoid the development of a pressure differential across the flange.

OPERATION

It will be found convenient to equip the test fixture with an extra set of standard wheel spindles, and then take the universal joints apart on each vehicle wheel; as to the front wheels, the ball joints and steering arms are disconnected, and as to the rear wheels, the suspension arms are unbolted. The vehicle is then crane-lifted into place and secured to the connecting means instead of to the wheels.

Terrain irregularities are simulated by vertical operation of the hydraulic rams servicing as vertical supports 2, 4, 6, 8. Actuation of the rams can conveniently be programmed for operation by computer to simulate any operation desired. For example, operation on a slope can be simulated by setting supports 2 and 6 a given amount higher or lower than supports 4 and 8; other simulations will become apparent to persons skilled in the art.

As a given spindle rises or falls in relation to the rest of the vehicle, the spindle is allowed to respond in accordance with the requirements of the suspension geometry. The severity of the rise depends on the elevation of the "bump" and vehicle speed, and the hydraulic ram can be programmed to lift the spindle at a rate commensurate with the terrain and speed simulated. Except as aided by the springs, fall of a vehicle wheel is "free" (gravitational), so it may in some cases suffice to allow the hydraulic ram to lower under the influence of gravity, although I propose to power down.

To simulate the fore-and-aft loading of striking an obstacle, the two-headed arrow $f$, FIGS. 1 and 5, represents a reciprocating force input capability, which is desirably also programmed into the computer that controls the test. Preferably, this is accomplished through hydraulic rams as aforesaid, connected through any one or all four of the fore-and-aft force input connectors such as those shown at 92 and 94 in FIG. 2, the rams being connected at their other ends with the building structure, such as the wall 16 shown in FIG. 1.

In most instances, the transverse force inputs can be accomplished by tilting the vehicle during test, i.e., by running with the vertical supports on one side at a higher level than those on the other. If a closer control of transverse forces is desired, the invention is here disclosed with a transverse force input capability represented by two-headed arrows $t$, FIGS. 1, 2, 3 and 4. Again, these inputs may be provided by means of hydraulic rams even as the vertical force inputs are here shown as provided by hydraulic rams. The transverse forces are applied to the vehicle through pairs of ears such as those shown at 104 and 108, FIGS. 2, 3 and 4, having force input connectors such as the one shown at 106 in FIG. 2. Again, to facilitate interchangeability of parts, all the connectors 92, 94 and 106 are identical.

The six degrees of freedom symbolized by two-headed arrows $v$, $f$, and $t$, and $o_v$, $o_f$, and $o_t$ and detailed above give each wheel spindle complete freedom to follow the path it must follow by virtue of its suspension geometry. The invention here disclosed and claimed shows a torque input capability similar to $o_t$ but about an axis which is the spindle axis for each wheel, i.e., the axis of housings 32, 34, 36, and 38. The purpose of such a torque input capability is to provide a realistic capacity to test the vehicle under load in terms of wheel drive, thus enabling simulation of constant speed load at any selected speed, acceleration, deceleration, braking, and the like. Torque inputs are through dynamometer couplings 110 and 112.

Reference is made now to the feature which permits wheel bearing adjustment with the vehicle in place on the fixture; see FIG. 8. The mechanic removes cap screws 176 and thus coupling 112. That provides access to polygonal end 186 of wrench 182. There is enough clearance between hub 190 and the inside diameter of tube 168 to allow the mechanic to loosen set screw 194 so that wrench 182 is free to turn in hub 190. After making the bearing adjustment, the mechanic retightens set screw 194 and replaces coupling 112.

I wish it to be understood that I do not desire to be limited to the exact details of construction shown and described, for obvious modifications will occur to a person skilled in the art.

I claim:

1. A wheeled vehicle support fixture for subjecting the supported vehicle to forces representative of actual terrain irregularities, comprising:
    a. a housing for each vehicle wheel spindle;
    b. individual power means for moving each spindle housing in a vertical direction to simulate vertical wheel movement over irregular terrain; and
    c. motion-producing connector means between each spindle housing and its power means for causing the housing to move horizontally along the spindle axis and also normally to the spindle axis when the power means is operating;
    d. each connector means comprising at least one bifurcated element, a guide element extending between the opposed arms defined by the bifurcated element, and a pillow block slidably positioned on the guide element for oscillatory movement therealong.

2. The fixture of claim 1 wherein the guide element comprises a circular shaft having sufficient length to permit substantial translation of the pillow blocks therealong.

3. The fixture of claim 2 and further comprising resilient means for yieldably centering the pillow block at the midpoint of the shaft.

4. The fixture of claim 3 wherein the bifurcated element is carried by the spindle housing.

5. The fixture of claim 4 and further comprising a force-input connector carried by at least one of the spindle housings to provide horizontal force inputs representative of actual fore-and-aft forces encountered by the vehicle during service.

6. A wheeled vehicle support fixture for subjecting the supported vehicle to forces representative of actual terrain irregularities, comprising:
    a. a housing for each vehicle wheel spindle;
    b. individual power means for moving each spindle housing in a vertical direction to simulate vertical wheel movement over irregular terrain; and
    c. motion-producing connector means between each spindle housing and its power means for causing the housing to move horizontally along the spindle axis and also normally to the spindle axis when the power means is operating;
    d. each connector means comprising a first horizontal shaft carried by the spindle housing, a second horizontal shaft carried by the power means at right angles to the first shaft, and a pillow block slidably encircling each shaft for translational movement therealong; the shafts being circular to enable the pillow block to rotate on each shaft during operation of the aforementioned power means.

7. The fixture of claim 6 wherein each shaft has sufficient length to permit substantial translation of the pillow block therealong.

8. The fixture of claim 7 and further comprising resilient means for yieldably centering the pillow block at the midpoint of each shaft.

9. The fixture of claim 8 wherein the first horizontal shaft is connected to the spindle housing by means of a bifurcated element having opposed arms engaged with the shaft ends.

10. The fixture of claim 9 and further comprising a force input connector carried by at least one of the spindle housings to provide horizontal force inputs representative of actual fore-and-aft forces encountered by the vehicle during service.

11. The fixture of claim 6 and further comprising resilient means for yieldably centering the pillow block at the midpoint of each shaft.

12. The fixture of claim 11 wherein the second horizontal shaft is connected to the associated power means through a bifurcated element having opposed arms engaged with the shaft ends.

13. A wheeled vehicle support fixture for subjecting the supported vehicle to forces representative of actual terrain irregularities, comprising:
   a. a housing for each vehicle wheel spindle;
   b. individual power means for moving each spindle housing in a vertical direction to simulate vertical wheel movement over irregular terrain; and
   c. a motion-producing connector means between each spindle housing and its power means for causing the housing to move horizontally along the spindle axis and also normally to the spindle axis when the power means is operating;
   d. each connector means comprising a first shaft carried by the spindle housing, a second shaft carried by the power means in crosswise relationship to the first shaft, and a pillow block having translatory engagement with each shaft.

14. The fixture of claim 13 wherein the first shaft is connected to the spindle housing by means of spaced arms projecting from the housing to engage the shaft ends.

15. The fixture of claim 13 and further comprising a force-input connector carried by at least one of the spindle housings to provide force inputs representative of actual fore-and-aft forces encountered by the vehicle during service.

* * * * *